(12) United States Patent
Watkins

(10) Patent No.: US 11,983,494 B1
(45) Date of Patent: May 14, 2024

(54) APPARATUS AND METHOD FOR DYNAMIC DATA SYNTHESIS AND AUTOMATED INTERFACING

(71) Applicant: Tax Guardian, LLC, Oklahoma City, OK (US)

(72) Inventor: Travis Watkins, Oklahoma City, OK (US)

(73) Assignee: Tax Guardian, LLC, Oklahoma City, OK (US)

( * ) Notice: Subject to any disclaimer, the term of this patent is extended or adjusted under 35 U.S.C. 154(b) by 0 days.

(21) Appl. No.: 18/383,246

(22) Filed: Oct. 24, 2023

(51) Int. Cl.
  *G06F 40/279* (2020.01)
  *G06F 40/174* (2020.01)
  *G06V 30/148* (2022.01)

(52) U.S. Cl.
  CPC .......... *G06F 40/279* (2020.01); *G06F 40/174* (2020.01); *G06V 30/153* (2022.01)

(58) Field of Classification Search
  CPC .... G06F 40/279; G06F 40/174; G06V 30/153
  USPC .............................................................. 704/9
  See application file for complete search history.

(56) References Cited

U.S. PATENT DOCUMENTS

| 8,423,434 B2 | 4/2013 | Ramsey |
| 11,030,705 B1 | 6/2021 | Pascual |
| 11,354,755 B2 | 6/2022 | Goldman |

*Primary Examiner* — Thierry L Pham
(74) *Attorney, Agent, or Firm* — Caldwell Intellectual Property Law

(57) ABSTRACT

An apparatus and method for dynamic data synthesis wherein the apparatus receives a first textual data set, displays at least an interface field, populates the at least an interface field with at least an element of the first textual data set, generates a destination-formatted query using the populated at least an interface field, transmits the formatted query to a remote device, receives a second textual data set, outputs a user score and a set of score metadata, generates a comprehensive report, and displays the comprehensive report to the user.

20 Claims, 8 Drawing Sheets

APPARATUS AND METHOD FOR DYNAMIC DATA SYNTHESIS AND AUTOMATED INTERFACING

FIELD OF THE INVENTION

The present invention generally relates to the field of machine-learning. In particular, the present invention is directed to an apparatus and method for dynamic data and language synthesis and automated interfacing.

BACKGROUND

Data inputs and the various interfacing mechanisms often present redundant, unnecessary prompts for information. Even after compiling all the sought information, the interfacing mechanism is often incapable of synthesizing the data into the proper useful formats, and is rarely able to submit synthesized data to the appropriate external entity. Additionally, it is often difficult to comprehend the status and likely outcome based on the compiled information to enable the user to anticipate a next step or address a potential conflict.

SUMMARY OF THE DISCLOSURE

In an aspect, an apparatus for dynamic data synthesis wherein the apparatus receives a first textual data set, displays at least an interface field, populates the at least an interface field with at least an element of the first textual data set, generates a destination-formatted query using the populated at least an interface field, transmits the formatted query to a remote device, receives a second textual data set, outputs a user score and a set of score metadata, generates a comprehensive report, and displays the comprehensive report to the user.

In an aspect, a method for dynamic data synthesis wherein the method comprises receiving, by the at least a processor, a first textual data set, displaying, by the at least a processor, at least an interface field, populating, by the at least a processor, the at least an interface field with at least an element of the first textual data set, generating, by the at least a processor, a destination-formatted query using the populated at least an interface field, transmitting, by the at least a processor, the formatted query to a remote device, receiving, by the at least a processor, a second textual data set, outputting, by the at least a processor, a user score and a set of score metadata, generating, by the at least a processor, a comprehensive report, and displaying, by the at least a processor, the comprehensive report to the user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and method for dynamic data synthesis wherein the apparatus receives a first textual data set, displays at least an interface field, populates the at least an interface field with at least an element of the first textual data set, generates a destination-formatted query using the populated at least an interface field, transmits the formatted query to a remote device, receives a second textual data set, outputs a user score and a set of score metadata, generates a comprehensive report, and displays the comprehensive report to the user.

Figure 1:
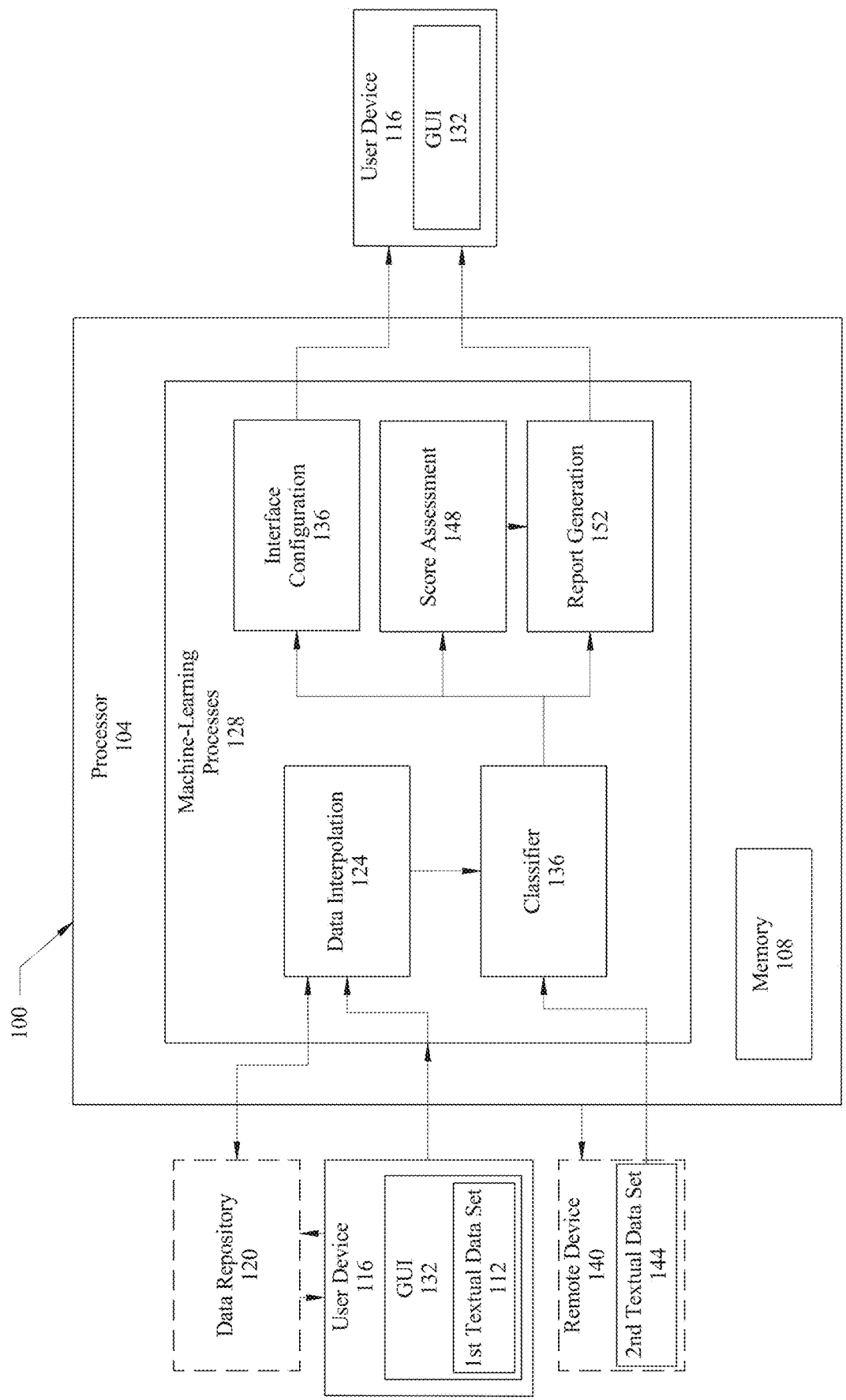
FIG. 1 is a block diagram of an exemplary embodiment of an apparatus for dynamic data synthesis and automated interfacing.

Referring now to FIG. 1, an exemplary embodiment of apparatus 100 for dynamic data synthesis and automated interfacing is illustrated. The apparatus includes a processor 104. Processor 104 may refer to any computing device as described in this disclosure, including without limitation a microcontroller, microprocessor, digital signal processor (DSP), and/or system on a chip (SoC) as described in this disclosure. Processor 104 may include, be included in, and/or communicate with a mobile device such as a mobile telephone or smartphone. Processor 104 may include a single computing device operating independently, or may include two or more computing devices operating in concert, in parallel, sequentially, or the like; two or more computing devices may be included together in a single computing device or in two or more computing devices. Processor 104 may interface or communicate with one or more additional devices as described below in further detail via a network interface device. Network interface devices are described in detail below. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable the scalability of apparatus 100 and/or processor 104. Detailed description of a computing device embodiment is described below in reference to FIG. 7.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With further reference to FIG. 1, processor 104 is configured by a memory 108 to receive, from a user, a first textual data set 112. First textual data set 112 includes at least a non-textual document and may include a compilation of an individual's or business' government-affiliated status and includes past, present, and future related documents and artifacts. In a non-limiting embodiment, first textual data set 112 may contain an individual's tax filing and audit history including all former filings, forms used, and filing results. First textual data set 112 may further include personal information of the individual, including address, familial status, employment status, earnings, owned properties and other assets, deductible expenses including any charitable activities and costs, interest-accruing account details, investments, and any other tax filing related information. In a separate non-limiting embodiment, first textual data set 112 may be used in support of a corporate entity, wherein it would contain not only the details described above for an individual, but also a collection of employee payment information, health insurance plans, retirement accounts, loans, profits, payments, business assets, any discipline specific deductions or liabilities depending on the type of business, and any other Internal Revenue Service concerned information.

With continued reference to FIG. 1, first textual data set 112 may be submitted to processor 104 using a user device 116. User device 116 may include any device suitable for use as a computing device as described in this disclosure. User device 116 may be a single, stand-alone digitally connected device. User device 116 may also communicate through a network of connected devices. In a non-limiting embodiment, a device that captures one or more elements of profile data and/or performs one or more steps described in this disclosure may be communicatively connected to one or more other devices, including without limitation any devices described in this disclosure, a local area network (LAN), a wide area network (WAN) such as the Internet or a subset thereof, such that all recorded data may be accessible via any other web enabled device. In this way, first textual data set 112 may be requested and imported into processor 104 via a web or local network interface. Processor and/or another device may divide processing tasks between multiple processors to accelerate classification and handling. First textual data set 112 may be received through a direct file importing process, wherein the relevant data may be saved and downloaded to processor 104. This may include file transfers from any type of hard drive or other memory type exchange or replication. First textual data set 112 may be locally generated in cases where processor 104 is directly associated with a computing device capable of generating direct inputs. First textual data set 112 may also be imported into processor 104 through manual generation, wherein a user populates all necessary data by any mechanism wherein the profile data is made available to apparatus 100.

With continued reference to FIG. 1, processor 104 is also configured to receive a first textual data set 112 using an application programming interface (API). As used herein, an "application programming interface" is a set of functions that allow applications to access data and interact with external software components, operating systems, or microdevices, such as another web application or computing device. An API may define the methods and data formats that applications can use to request and exchange information. APIs enable seamless integration and functionality between different systems, applications, or platforms. An API may deliver a first textual data set 112 to apparatus 100 from a system/application that is associated with a user or other third party custodian of user information. An API may be configured to query for web applications or other websites to retrieve a first textual data set 112 or other data associated with the user. An API may be further configured to filter through web applications according to a filter criterion. In this disclosure, "filter criterion" are conditions the web applications must fulfill in order to qualify for API. Web applications may be filtered based off these filter criterion. Filter criterion may include, without limitation, web application dates, web application traffic, web application types, web applications addresses, and the like. Once an API filters through web applications according to a filter criterion, it may select a web application. Processor 104 may transmit, through the API, user data include a first textual data set 112 to apparatus 100. API may further automatically fill out user entry fields of the web application with the user credentials in order to gain access to the first textual data set 112. Web applications may include, without limitation, a social media website, an online form, file scanning, email programs, third party websites, governmental websites, or the like.

Continuing to refer to FIG. 1, processor 104 may use first textual data set 112 to extract at least a textual datum from the at least a non-textual document using optical character recognition. Optical character recognition or optical character reader (OCR) may be applied upon submission of first textual data set 112 into processor 104 and includes automatic conversion of images of written information (e.g., typed, handwritten or printed text) into machine-encoded text. In some cases, recognition of at least a keyword from an image component may include one or more processes, including without limitation OCR, optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIG. 2. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool includes OCRopus. OCRopus development is led by German Research Centre for Artificial Intelligence in Kaiserslautern, Germany.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1, first textual data set 112 may be already aggregated and assembled based on prior use of apparatus 100, and simply imported from a data repository 120. Data repository 120 may be a local hard drive specifically affiliated with processor 104, or it may be a remote storage device including a remote hard drive, cloud storage, thumb drive, or any other digital storage method. Data repository may include a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, upon receipt of first textual data set 112, processor configures user device 116 to display at least an interface field. An "interface field," as used in this disclosure, is a dynamic, operation-based input option displayed to a user. Processor may configure user device to display interface field using hypertext markup language (HTML), extensible markup language (XML), client-side programs, server-side programs, or the like. In a non-limiting embodiment, interface field may initially include a drop-down list or other presentation of one or more selectable options for the user to identify a subsequent engagement type. In cases where first textual data set 112 combined with data repository 120 applicable data includes sufficient information for processor 104 to identify an engagement type, interface field may include a text box enabling user to populate the requisite data to continue the engagement. Interface field may display at least a plurality of real-time, automated interface field modifications based on first textual data set 112 and any subsequent user inputs or selections.

Still referring to FIG. 1, processor 104 and/or a data interpolation 124 module operating on processor populates the at least an interface field with at least an element of the first textual data set 112. Processor and/or data interpolation 124 may utilize machine-learning processes 128 to identify at least a missing element of the first textual data set 112. Processor 104 and/or data interpolation 124 may identify a plurality of requisite or supportive data in data repository and/or in first textual data 112 using machine-learning processes and based on the first textual data set. Data interpolation module 124 may resolve missing or errant information by identifying information matching missing and/or errant information in first textual data set 112 and/or by querying data repository 120. When the missing information is available in any part of first textual data set 112 or data repository 120, interface field is automatically populated with the proper information. Processor 104 repeats this process until interface fields are still missing information after all available sources are exhausted. After retrieving the at least an additional data element from data repository 120, processor 104 generates the at least an additional element using machine-learning processes 128. In a non-limiting embodiment, after user submits last year's 1040 IRS tax form, user device 116 would then display an interface field verifying user intends to file an updated 1040 IRS tax form for the current year. Processor 104 may then populate all carryover information, then query data repository 120 for the still missing information. If data repository 120 still does not provide the requisite information to complete the current year 1040 form, interface field may prompt user to populate the missing information with a short description of the information needed. This may be performed iteratively using processes as described below.

Still referring to FIG. 1, processor 104 may engage user to respond to a series of questions. A series of questions may be implemented using a chatbot. As used herein, a "chatbot" is a machine-learning supported, bidirectional, live query and response interface, as described in detail below in reference to FIG. 4. A chatbot may be configured to generate questions regarding the user's current individual or business-related government entity affiliation questions. In a non-limiting embodiment, a user may be prompted to input specific information or may fill out a questionnaire. In an embodiment, a graphical user interface (GUI) 132 may display a series of questions to prompt a user for information pertaining to first textual data set 112. Chatbot may also be engaged outside of GUI 132, in any device capable of hosting the digital entity and providing the inputs and responses back to processor 104. Chatbot may be used when the limited information provided by the user within first textual data set 112 may fit a set of multiple potential scenarios, which can only be isolated to a single option through additional information. In that case, chatbot would prompt the user to provide the final required information, processor 104 would incorporate user response into first textual data set 112, then appropriately prosecute the operation based on the new information. As a further example, chatbot may display a list of possible forms to file or situations which would lead user to specific forms or actions, from which user may select each applicable form or situation the user currently has needs or application for. In a non-limiting embodiment, processor 104 may receive user selection of a charitable deduction assessment and populate an IRS Form 8283 based on the subsequently provided details as a function of the user selection. In another example, and without limitation, a head of household who recently had a baby may use GUI 116 and/or remote display 112 and/or the chatbot to generate a populated IRS Form 1040. Chatbot operations are discussed in detail below in reference to FIG. 4.

Still referring to FIG. 1, a classifier 136 may iteratively organize and label input data. Classifier 136 may use machine-learning processes 128 to conduct analysis and manipulation of first textual data set 112 information in order to generate interface, populate forms, exchange information, or otherwise process information associated with first textual data set 112. Machine-learning processes, generally, are discussed in detail below in reference to FIG. 2. Classifier 136 may apply descriptors to the information contained within first textual data set 112 and/or appended information from data repository 120. Descriptors may operate as data tags to recognize and organize pertinent details which may later be relied upon to effectively execute user-defined needs. Descriptors may be applied to individualized data, or groupings of information provided within first textual data set 112. In a non-limiting embodiment, classifier 136 may interpret a user's profile containing user's salary and business financial details such that it applies descriptors of a small business owner. These descriptors may enable a more focused analysis of any potential needs, issues, or opportunities specifically relevant to the user. Classifier 136 may rely on fuzzy set pairing methods, wherein a descriptor may be assigned to a characteristic, or group of characteristics contained within first textual data set 112, such that the characteristic and descriptor have sufficient fuzzy set overlap as compared to a threshold match to warrant pairing. This process of fuzzy set pairing is described in detail below in reference to FIG. 3. Classifier 136 and the training data incorporated is defined and described in detail below in reference to FIG. 2.

Continuing to refer to FIG. 1, training data may include a plurality of examples, each including at least an input and at least an expected output; for instance, an input in training examples may include a sample of data that may be been received similarly to first textual data set 112 and/or data of a similar type, and/or a sample of data contained in and/or similar to data repository data, correlated with a label or other data element identifying a field into which the data may be entered; labels may be entered by users explicitly and/or may be applied when a user manually enters data in fields, so that classifier 136 can continuously and iteratively learn to populate more fields under more circumstances after deployment. Classifier 136 may rely on training data to inform its grouping and descriptor classifications. Training data may also be in the form of user feedback on a completed machine-learning evolution. Where a conversion is successful, user may provide feedback in the form of validating a successful operation, in which case machine-learning processes 128 would either take no action, or promote the associations relied upon for that specific engagement. Additionally, after a successful operation, no user feedback may be provided, in which case machine-learning processes 128 would neither promote nor suppress the associations used for that specific process, but rather continuing the input to output operation as before. Training data may also use failed prior operations, in conjunction with user feedback addressing a specific failure mechanism such that processor 104 and machine-learning processes 128 may be improved to embrace the correct operations and reject the method used in the failed conversions. In some embodiments, training classifier 136 and/or machine-learning process 128 may iteratively include updating the training data as a function of the input and output results of the machine learning process and/or classifier. The machine learning process 128 and/or classifier may be retrained using the updated training data. These types of input to output correlations built over numerous operations train a machine-learning model to apply appropriate methods dependent on first textual data set 112 inputs and situational circumstances as provided by other external inputs. Still referring to FIG. 1, instantiation of a machine-learning model may be performed on an analytical circuit device. Instantiation of the machine-learning model can be done using hardware rather than software by running the same inputs through a chip where, through transistor gating, the chip executes the same functions as the software would have. The chip can be updated in some cases (e.g. an FPGA can be "configured" to change its circuitry). This instantiation and further discussion of training data is covered in detail below in reference to FIG. 2.

Still referring to FIG. 1, user device 116 is continuously updated in real-time by an interface configuration 136 module to present a subsequent plurality of interface fields to the user by updating available fields, highlighting fields with available user inputs, and/or presenting a generated dialogue window with the subsequent interface fields enclosed. Interface configuration 136 processes the available data for the specific engagement and modifies user device 116 display and/or GUI 132 to efficiently focus the user on the next required action or missing information to resolve. The responses from user to these auto-generated interface fields may then supplement the first textual data set with at least an additional element, wherein the additional element is the user response. Once a user response is submitted to any of the plurality of presented interface fields, processor 104 may then update or modify the displayed interface fields based on the entire compilation of aggregated information relevant to the specific user engagement.

Still referring to FIG. 1, processor 104 generates a destination-formatted query using the populated at least an interface field based on the gathered data for the specific engagement. The process of generating the appropriately formatted query may require retrieving a historical formatted query from data repository 120. In a non-limiting embodiment, wherein a past engagement was sufficiently similar and the query saved within data repository 120, the current engagement may implement the format used in the past engagement to validate the format and/or query a remote device 140. Wherein no historic sample formats are available, processor 104 may retrieve the accepted format from remote device 140. Upon retrieval, processor 104 may apply the validated accepted format from remote device 140 to the populated at least an interface field with at least an element of the first textual data set.

Still referring to FIG. 1, once properly formatted, processor 104 transmits the formatted query to remote device 140. Transmission of the formatted query to remote device 140 may be in the form of digital communications such as a third party submission portal, email, fax, web-based submission form, or any other digital communication of a textual data set. Transmission of the formatted query to remote device 140 may additionally include a tangible material submission, in which case processor 104 may generate the digital file in its proper format to print and submit, then prompt the user to take the necessary action (i.e. printing the formatted query and mailing it or delivering it to the specified location).

Still referring to FIG. 1, processor 104 receives, from remote device 140 and based on the query, a second textual data set 144. Second textual data set is comprised of at least a non-textual document and may, again, include a compilation of an individual's or business' government-affiliated status or profile information including past, present, and future related documents and artifacts affiliated with the formatted query. Transmitting a formatted query to a remote device and receiving, from the remote device and based on the query, a second textual data set may iteratively repeat until all necessary data is obtained, or until it is verified that remote device 140 is not able to provide the data sought. Additionally, processor 104 may be configured to transmit a formatted query to a remote device at each predetermined time intervals. This may include transmitting a formatted query every 24 hours, 12 hours, 4 hours, 1 hour, minute, once every business day, and the like. This process may repeat iteratively repeat until the second textual data set is received. Remote device may be a interface point to a third party, wherein the third party may be a government entity. As used herein, "government entity" refers to any governmental organization which collects and/or retains any information relevant to individuals and/or business entities with continuing obligations to/from that governmental organization. In a non-limiting embodiment, a government entity may refer to the Internal Revenue Service (IRS) and its tax information repository, whether digitally or physically maintained. The government entity may additionally refer to state traffic tribunal which maintains all traffic violation tickets and details. Each government entity may enforce a unique set of information request and submission requirements. To enable processor 104 to effectively exchange information with the government entity through remote device 140, user may be required to initially file a disclosure authorization, such as a Form 8821 in the case of the IRS to allow automated processing of requests and submissions. Where certain forms are mandatory and required prior to any other operation, processor 104 may auto-populate the form with information from first textual data set 112 or data repository 120, then prompt user to complete any missing or errant information prior to submission. Responses from remote device 140 are incorporated into the engagement profile along with first textual data set 112 and any other user inputs such that user may not need to reformat or translate any information. In a non-limiting embodiment, processor 104 may support direct submission and processing of documents, artifacts, and communications from remote device 140. When anything is received directly from remote device 140, user device 116 and/or GUI 132 may generate a notification for user summarizing and informing user of the communication. Additionally, if any action is required in response to the direct communication, machine-learning processes 128 may automatically generate the appropriate response for user to approve and submit upon user's next engagement with apparatus 100. Additionally, processor 104 may automatically update the displayed interface field(s) to reflect the new actions or needs.

Continuing reference to FIG. 1, in an embodiment a second textual data set 144 may include information associated with one or more tax codes. As used in the current disclosure, a "tax code" is an identifier that indicates the occurrence of one or more events related to the users taxes. A tax code may serve as an identifier or alphanumeric representation that signifies the occurrence of specific events or conditions related to a user's taxes. This identifier helps in categorizing and organizing tax-related information, events, or transactions within a tax system or software. Events may include income types, deductions and credits, tax filing status, tax forms and schedules, tax rates, taxable events, tax compliance status, jurisdictional information, and the like. In an embodiment, a tax code may include identifier signifying events surrounding deductions, credits, or exemptions that impact the taxable income, such as mortgage interest deduction, child tax credit, medical expenses deduction, the employee retention credit, and the like.

Continuing to refer to FIG. 1, GUI 132 may enable all of the various forms of user interaction with processor 104. A "graphical user interface," as used herein, is a graphical form of user interface that allows users to interact with electronic devices. In some embodiments, GUI 132 may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

Continuing to refer to FIG. 1, machine-learning processes 128 may determine the requisite operations based on classifier 136 descriptors. The applied descriptors may either have identified a specific course, or may require further information based on a decision tree-like mechanism to isolate the follow-on steps. Once sufficient inputs are gathered to isolate a specific course, machine-learning processes 128 may initiate the affiliated actions. In most cases, one of the affiliated actions may be for interface configuration 136 to modify the selections available within GUI 132 to reflect the narrowed options. In a non-limiting embodiment, interface configuration 136, upon recognizing a set of descriptors applied by classifier 136 which indicate a late tax filing will be essential, would then prompt the user to fill out an IRS Form 4868. Interface configuration 136 may further prompt user for any missing information necessary to complete that form and submit it to remote device 140. In a non-limiting embodiment, machine-learning processes 128 and/or data repository 120 may contain a set of IRS audit statistics based on the type of filing, amount of money at issue, type of data relied upon, and other circumstantial evidence enabling machine-learning processes 128 to compare a current operation to national audit statistics and assess whether a current first textual data set 112 is likely to generate an IRS audit. In a separate non-limiting embodiment, machine-learning processes and/or data repository 120 may contain the Department of Homeland Security form I-589, Application for Asylum, and the associated submission protocols such that machine-learning processes 128, after identifying that I-589 is the appropriate form, would automatedly populate the form with available user info the prompt user for any outstanding information required. In further reference to the asylum embodiment, machine-learning processes 128 or data repository 120 may contain statistics about the types of families and issues which are granted asylum which the user may use to answer the extended short answer prompts contained within the form. Processor 104 may additionally rely on a web crawler or other internet search mechanism to gather standards and protocols data. In a non-limiting embodiment, apparatus 100 may rely on proprietary information about tax audit likelihood developed by a specific tax agency based upon years of customer engagements. User may periodically choose to update the proprietary standards and processes when more recent or more focused data becomes available. Processor 104 may also be programmed to update automatically based on new information.

Still referring to FIG. 1, interface configuration 136 may modify GUI 132 display in real time with every changing input from user. A baseline GUI 132 may be presented initially before any first textual data set 112 data is input, which includes all of the options for all of apparatus 100 capabilities, including interfacing with various government entities 120. As interface configuration 136 identifies attributes to eliminate options, it modifies GUI 132 to no longer include options which don't apply. In a non-limiting embodiment, GUI 132 may initially contain a drop-down list for user to select which government entity user intends to engage with, then further enable user to select from a list of operations supported by that specific government entity. Once user uploads first textual data set 112 which contains only prior IRS tax forms, interface configuration 136 may eliminate all non-IRS affiliated options. Interface configuration may enable a user to manually select an Environmental Protection Agency report, but that selection option will require additional steps since the input information is exclusively tax related and any agency other than the IRS would be a non-traditional selection. GUI 132 may generate dialogue boxes when a prompt is deemed important enough to require user acknowledgement. In a non-limiting embodiment, if a tax filing deadline is set to expire within 24 hours, GUI 132 may prompt user to acknowledge the impending filing requirement prior to closing the application or ending the user's engagement session. In a separate non-limiting embodiment, interface configuration 136 may recommend specific forms to be filled out based on first textual data set 112 in conjunction with a set of user responses or selections indicating the user's need. In that case interface configuration 136 may promote the recommended form by highlighting it within GUI's 132 list of other available forms or may populate the form and immediately request user approval to generate and transmit the form. Interface configuration 136 actions based on user inputs and available data are dictated by machine-learning processes 128 and affiliated training data. In a non-limiting embodiment, when machine-learning processes 128 identifies usage patterns, such as consistently filing a specific form within a certain date range, interface configuration 136 then promotes that patterned response such that the interface streamlines the mechanism and selections required to implement the identified pattern. This concept, and training data generally, are covered in detail below in reference to FIG. 2.

Still referring to FIG. 1, a score assessment 148 is conducted based on first textual data set 112, second textual data set 144, a set of score metadata based on both data sets, all additional user inputs, and any applicable deadlines or statistical information available to processor 104. Score assessment 148 evaluates the relevant aspects of an engagement to determine a plurality of sub-scores. These sub-scores are isolated quantified analyses of the various aspects of any engagement and include measuring the impact of any potential issues or concerns associated with the engagement and prompts user on how to most effectively mitigate the risk or optimize a situation. Score assessment 148 may implement a single sub-score, or multiple sub-scores depending on the type of engagement and the various affiliated metrics. In a non-limiting embodiment, user may again be a head of household tax-paying citizen submitting first textual data set 112 on April $14^{th}$. Score assessment 148, relying on historic data to apply the government entity deadline of April $15^{th}$ as the tax filing deadline would assess a poor sub-score reflecting the severity of required action in order to comply with the April $15^{th}$ deadline. Additionally, score assessment 148 assess a separate sub-score based on first textual data set's 112 quantified deductions. In this continued non-limiting embodiment, where user's quantified deductions compared to user's gross income submitted is in the $97^{th}$ percentile for U.S. citizens score assessment 148 may assess another poor sub-score reflecting the high audit probability. These types of sub-scores may be indicative of user being fully compliant and payments up-to-date, or a substandard sub-score may indicate filing delays, improper claims, or an impending audit being likely. Sub-scores may additionally incorporate any other relevant and available data as factors within sub-score generation. Sub-scores generated by score assessment 148 may be based on proprietary data from historic engagements, machine-learning training data from prior engagements, or any other available assessment tool.

With continued reference to FIG. 1, processor 104 may be configured to output a user score and a set of score metadata based on the first textual data set and the second textual data set. As used in the current disclosure, an "user score" is a score that describes an assessment of a user specific situation. In some cases. a user score may be generated as a function of a second textual data set and/or a tax code. A user score may be a reflection of how the event's represented by the tax code will impact the user. A user score may additionally be a reflection of the severity of the event related to the tax code. This may include urgency or the need for attention for the event. In some cases, each event or combination of events may be assigned a given tax score based on the user's overall situation. In an embodiment, a user specific situation may include an evaluation of individual's or a business's tax events. Processor 104 may be able to determine the occurrence of one or more tax events as a function of the comparison between the first textual data set and the second textual data set. A user score may reflect how well they manage their tax obligations, including filing accurate tax returns, paying taxes on time, and utilizing legal tax deductions and credits to minimize their tax liability. A higher tax score would indicate effective tax planning and compliance, while a lower score might suggest potential issues or missed opportunities. A processor 104 may generate a user score or a sub-score for each tax event or attributes associated with the taxes of the entity. A user score may be used to normalize the first textual data set and the second textual data set to bring all tax events onto a comparable scale. This step is important to eliminate any bias introduced by different units or measurement scales. Normalization techniques can include min-max scaling, z-score normalization, or logarithmic transformation. A user score may be expressed as a numerical score, a linguistic value, or an alphabetical score. User score may be represented as a score used to reflect the degree to which an event is a liability, or the urgency needed to address the tax event. In a non-limiting example, of a numerical score, may include a scale from 1-10, 1-100, 1-1000, and the like, wherein a rating of 1 may represent an event that does not require the user's attention, whereas a rating of 10 may represent a tax event that requires immediate attention from the user. In another non-limiting example, linguistic values may include, "Immediate Attention," "Future attention Needed," "Attention needed soon," "No attention required," and the like. In some embodiments, linguistic values may correspond to a linguistic the user score range. For example, a tax event that receives a score between 40-60, on a scale from 1-100, may be considered a "Future Attention Needed."

With continued reference to FIG. 1, the user score for each event may be generated based on one or more event quantifiers. As used in the current disclosure, an "event quantifier" is a quantifier used to give each tax event a weight. As used in the current disclosure, a "Tax Event" is any occurrence or transaction that triggers tax implications, either for individuals or businesses. Examples of tax events may include any notice from the governmental agency. Tax events may additionally include income generations, asset sales, business transactions, inheritance gifts, retirements and pensions, filing tax returns, filing for a tax credits, updates regarding a tax credits, notices for missing information, and the like. An event quantifier may be used to assign weights or importance values to each tax event based on their statistical significance and impact on entity performance. This can be done using statistical models, domain expertise, or machine learning algorithms. The weights should reflect the relative contribution of each event to the overall entity's success. Processor 104 may generate an event quantifier based on past user scores or comprehensive reports. A processor may generate an event quantifier based on historical tax events, event quantifiers for entities of similar size, industry, and status. Processor 104 may additionally apply analytical statistical techniques to analyze the data and assess the relationship between each tax event and the overall entity performance. Techniques such as correlation analysis, regression analysis, or machine learning algorithms may be used to help identify the events that have a significant impact on business outcomes.

With continued reference to FIG. 1, processor 104 may generate user score using a score machine-learning model. As used in the current disclosure, a "score machine-learning model" is a machine-learning model that is configured to generate user score. Score machine-learning model may be consistent with the machine-learning model described below in FIG. 2. Inputs to the score machine-learning model may include the first textual data set 112, the second textual data set 144, score assessments, destination-formatted query, examples of user score, and the like. Inputs into the score machine learning-model may include any data mentioned herein throughout the entirety of this disclosure. Outputs to the score machine-learning model may include user score tailored to the first textual data set 112 and the second textual data set 144. score training data may include a plurality of data entries containing a plurality of inputs that are correlated to a plurality of outputs for training a processor by a machine-learning process. In an embodiment, score training data may include the first textual data set 112 and the second textual data set 144 correlated to examples of a user score. Score training data may be received from database 300. Score training data may contain information about textual data set 112, the second textual data set 144, score assessments, destination-formatted query, examples of user score, and the like. Training data may include any data mentioned herein throughout the entirety of this disclosure. In an embodiment, score training data may be iteratively updated as a function of the input and output results of past score machine-learning model or any other machine-learning model mentioned throughout this disclosure. The score machine-learning model may then be retrained using the updated score training data. The score machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

Still referring to FIG. 1, using score assessment 148, processor 104 outputs a user score as a function of the plurality of sub-scores and outputs a set of score metadata as a function of the user score and each sub-score of the plurality of sub-scores. This process relies on the aggregation of all sub-scores into a single quantified metric to display to the user. The compilation of sub-scores and culmination of a overarching user score may be unique to each user engagement based on the different types and quantities of information available for assessment. Score assessment's 148 user score may conduct an objective assessment representative of the type of assessment the destination recipient would conduct. In a non-limiting embodiment, relying on the April 14$^{th}$ submission of a first textual data set for tax filing above, user score may incorporate the types of analyses an IRS agent would conduct including but not limited to, submission timing compared to deadlines, first impression outlandish submissions based on first textual data set's 112 inclusion of income or deductions which diverge substantially from standards, and compliance with guidelines and rules.

Still referring to FIG. 1, processor 104 may be configured to generate a comprehensive report using a language model and based on the user score and the set of score metadata. As used in the current disclosure, a "comprehensive report" is a detailed document that provides a comprehensive overview of various aspects of tax-related information. A comprehensive report may contain information relating the status of the user's taxes. This may include suggestions to maximize one or more tax returns. This may additionally include suggestions to the user how to minimize the taxes and/or tax penalties that may be paid. A comprehensive report may contain descriptions of missing information needed by the governing body. A comprehensive report may contain detailed breakdown of past tax payments, including dates, amounts, and methods of payment. A comprehensive report may additionally include identification of income sources, such as employment, investments, business income, etc. Comprehensive report may additionally include an overview of eligible deductions and tax credits, including any changes or updates. For example, comprehensive report may provide a user with a status update on the employee retention tax credit. In some cases, a comprehensive report may describe the user's eligibility or qualifications for a tax credit. This may additionally include an explanation of eligible wages and qualified wages. The comprehensive report may additionally include a description of the amount to be received by the user for a tax credit. In an additional embodiment, a tax report may include an overview of eligible deductions and tax credits, including any changes or updates. The comprehensive report may include the identification of a one or more significant events. As used in the current disclosure, a "significant event" is one or more event that requires the attention of the user. A significant event may include an identification of missing items, approved/denied requests, payment requests, payment ready, identification of an application is under review, and the like. In some cases, significant events may include events or occurrences that have a substantial impact on the user's tax-related matters. These events may include life events such as marriage, divorce, birth of a child, or death in the family, which can influence tax filing status and deductions. The events may additionally include income changes, tax law changes, investment transactions (i.e. buying or selling assets, investments, or property can trigger capital gains or losses, affecting tax obligations), and the like Still referring to FIG. 1, using a report generation 152 process, processor 104 may compile all engagement data including first textual data set 112, second textual data set 144, all user inputs and selections, and any score metadata into a summarized report for user. Report generation 152 generates a comprehensive report using a language model and based on the user score and the set of score metadata. Report generation 152 may promote and display to the user the substantive portions which diverge from historical norms, significantly contribute to user score, or portions which constrain or obligate future actions and may identify a risk based on non-conforming dollar amounts, or an opportunity for cost savings, efficiency gains, time or effort reduction, or some other potentially available improvement that user may not be using or aware of. In a non-limiting embodiment, after user submits first textual data set 112 which includes user's past tax transcripts and current business operations, score assessment 148 may identify the specified North American Industry Classification System (NAICS) code of the business and query whether user is currently seizing the affiliated federal, state, local, or industry-specific tax credits. Data repository 120 may retain these types of credits and opportunities available from each potential third party and prompt user to their potential benefits or savings.

Still referring to FIG. 1, in the continued non-limiting embodiment of a late tax submission, report generation 152 output would prompt the user of the immediate risk of filing late if not immediately completed. Report generation 152 may further recommend user to complete the requisite forms in order to properly submit the tax filing on time. Additionally, report generation 152 may assess that the quantified deductions compared to the gross income submitted is in the $97^{th}$ percentile for U.S. citizens and has a 75% likelihood of inducing an IRS audit based on proprietary and/or historic customer data. In a separate non-limiting embodiment, in reference to a user engaging apparatus 100 for IRS and tax purposes, report generation 152 may generate a wholistic tax overview based on user's historic compliance, user's instant tax status, and predictive insights for future filings. This tax overview may be indicative of user being fully compliant and payments up-to-date, or a substandard tax overview may indicate filing delays, improper claims, or an impending audit being likely. Tax overview may additionally incorporate any other relevant and available data as factors within score assessment 148 or report generation 152.

With continued reference to FIG. 1, processor 104 may generate a comprehensive report using a report machine-learning model. As used in the current disclosure, a "report machine-learning model" is a machine-learning model that is configured to generate comprehensive report. Report machine-learning model may be consistent with the machine-learning model described below in FIG. 2. Inputs to the report machine-learning model may include first textual data set 112, second textual data set 144, data interpolation 124, interface configuration 136, score assessment 152, examples of comprehensive report, user score, score metadata, sub-scores, interface field, and the like. Inputs may additionally include any data mentioned throughout the entirety of this disclosure. Outputs to the report machine-learning model may include comprehensive report tailored to the user score. Report training data may include a plurality of data entries containing a plurality of inputs that are correlated to a plurality of outputs for training a processor by a machine-learning process. In an embodiment, report training data may include a plurality of user scores and score metadata correlated to examples of comprehensive report. Report training data may be received from a database. Report training data may contain information about first textual data set 112, second textual data set 144, data interpolation 124, interface configuration 136, score assessment 152, examples of comprehensive report, user score, score metadata, sub-scores, interface field, examples of comprehensive report, and the like. In an embodiment, report training data may be iteratively updated as a function of the input and output results of past report machine-learning model or any other machine-learning model mentioned throughout this disclosure. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

With continued reference to FIG. 1, processor 104 may use user feedback to train the machine-learning models and/or classifiers described above. For example, classifier may be trained using past inputs and outputs of classifier. In some embodiments, if user feedback indicates that an output of classifier was "bad," then that output and the corresponding input may be removed from training data used to train classifier, and/or may be replaced with a value entered by, e.g., another user that represents an ideal output given the input the classifier originally received, permitting use in retraining, and adding to training data; in either case, classifier may be retrained with modified training data as described in further detail below. In some embodiments, training data of classifier may include user feedback.

With continued reference to FIG. 1, in some embodiments, an accuracy score may be calculated for classifier using user feedback. For the purposes of this disclosure, "accuracy score," is a numerical value concerning the accuracy of a machine-learning model. For example, a plurality of user feedback scores may be averaged to determine an accuracy score. In some embodiments, a cohort accuracy score may be determined for particular cohorts of persons. For example, user feedback for users belonging to a particular cohort of persons may be averaged together to determine the cohort accuracy score for that particular cohort of persons, and used as described above. Accuracy score or another score as described above may indicate a degree of retraining needed for a machine-learning model such as a classifier; processor 104 may perform a larger number of retraining cycles for a higher number (or lower number, depending on a numerical interpretation used), and/or may collect more training data for such retraining, perform more training cycles, apply a more stringent convergence test such as a test requiring a lower mean squared error, and/or indicate to a user and/or operator that additional training data is needed.

Still referring to FIG. 1, a report machine-learning model may include a large language model (LLM). A "large language model," as used herein, is a deep learning algorithm that can recognize, summarize, translate, predict and/or generate text and other content based on knowledge gained from massive datasets. Large language model may be trained on large sets of data; for example, training sets may include greater than 1 million words. Training sets may be drawn from diverse sets of data such as, as non-limiting examples, novels, blog posts, articles, emails, previous examples of a comprehensive report, first textual dataset 112, second textual dataset 144, score assessment 148, and the like. In some embodiments, training sets may include a variety of subject matters, such as, as nonlimiting examples, tax documents, tax forms, user inputs, business documents, inventory documentation, emails, advertising documents, newspaper articles, and the like. In some embodiments, training sets of LLM may include examples of first textual data sets 112, and as. In some embodiments, training sets of LLM may include information from one or more public or private databases. As a non-limiting example, training sets may include state and federal tax laws including relevant case law. In some embodiments, training sets may include portions of text related to tax law and business practices correlated to examples of a comprehensive report. In another embodiment, training sets may include user scores and score metadata correlated to examples of comprehensive reports.

With continued reference to FIG. 1, in some embodiments, LLM may be generally trained. For the purposes of this disclosure, "generally trained" means that LLM is trained on a general training set comprising a variety of subject matters, data sets, and fields. In some embodiments, LLM may be initially generally trained. In some embodiments, for the purposes of this disclosure, LLM may be specifically trained. For the purposes of this disclosure, "specifically trained" means that LLM is trained on a specific training set, wherein the specific training set includes data including specific correlations for LLM to learn. As a non-limiting example, LLM may be generally trained on a general training set, then specifically trained on a specific training set. As a non-limiting example, specific training set may include examples of comprehensive reports. As a non-limiting example, specific training set may include scholastic works. As a non-limiting example, specific training set may include information from a database. As a non-limiting example, specific training set may include text related to tax law and business practices correlated to examples of comprehensive reports.

With continued reference to FIG. 1, LLM, in some embodiments, may include Generative Pretrained Transformer (GPT), GPT-2, GPT-3, GPT-4, and the like. GPT, GPT-2, GPT-3, and GPT-4 are products of Open AI Inc., of San Francisco, CA. LLM may include a text prediction based algorithm configured to receive an article and apply a probability distribution to the words already typed in a sentence to work out the most likely word to come next in augmented articles. For example, if the words already typed are "Nice to meet", then it is highly likely that the word "you" will come next. LLM may output such predictions by ranking words by likelihood or a prompt parameter. For the example given above, the LLM may score "you" as the most likely, "your" as the next most likely, "his" or "her" next, and the like. LLM may include an encoder component and a decoder component.

Still referring to FIG. 1, LLM may include a transformer architecture. In some embodiments, encoder component of LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, an attention mechanism may represent an improvement over a limitation of the Encoder-Decoder model. The encoder-decider model encodes the input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, LLM may predict the next word by searching for a set of position in a source sentence where the most relevant information is concentrated. LLM may then predict the next word based on context vectors associated with these source positions and all the previous generated target words, such as textual data of a dictionary correlated to a prompt in a training data set. A "context vector," as used herein, are fixed-length vector representations useful for document retrieval and word sense disambiguation.

Still referring to FIG. 1, an attention mechanism may include generalized attention self-attention, multi-head attention, additive attention, global attention, and the like. In generalized attention, when a sequence of words or an image is fed to LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, LLM may pick up particular parts at different positions in the input sequence and over time compute an initial composition of the output sequence. In multi-head attention, LLM may include a transformer model of an attention mechanism. Attention mechanisms, as described above, may provide context for any position in the input sequence. For example, if the input data is a natural language sentence, the transformer does not have to process one word at a time. In multi-head attention, computations by LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bandanau attention mechanism), LLM may make use of attention alignment scores based on a number of factors. These alignment scores may be calculated at different points in a neural network. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, LLM may either attend to all source words or predict the target sentence, thereby attending to a smaller subset of words.

With continued reference to FIG. 1, multi-headed attention in encoder may apply a specific attention mechanism called self-attention. Self-attention allows the models to associate each word in the input, to other words. So, as a non-limiting example, the LLM may learn to associate the word "you", with "how" and "are". It's also possible that LLM learns that words structured in this pattern are typically a question and to respond appropriately. In some embodiments, to achieve self-attention, input may be fed into three distinct fully connected layers to create query, key, and value vectors. The query, key, and value vectors maybe fed through a linear layer; then, the query and key vectors may be multiplies using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With continued reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am", decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filed with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

With continued reference to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classier will be of size 10,000. The output of this classifier may be fed into a softmax layer which may serve to produce probability scores between zero and one. The index may be taken of the highest probability score in order to determine a predicted word.

With continued reference to FIG. 1, decoder may take this output and add it to the decoder inputs. Decoder may continue decoding until a token is predicted. Decoder may stop decoding once it predicts an end token.

With continued reference to FIG. 1, in some embodiment, decoder may be stacked N layers high, with each layer taking in inputs from the encoder and layers before it. Stacking layers may allow LLM to learn to extract and focus on different combinations of attention from its attention heads.

With continued reference to FIG. 1, LLM may receive an input. Input may include a string of one or more characters. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. Query may include, for example a question asking for a status update regarding user taxes. In some embodiments, input may include a set of symptoms or test results for a user.

With continued reference to FIG. 1, LLM may generate an output. In some embodiments, LLM may include multiple sets of transformer architecture as described above. Output may include a textual output. A "textual output," for the purposes of this disclosure is an output comprising a string of one or more characters. Textual output may include for example a comprehensive report. In some embodiments, textual output may include a phrase or sentence identifying the status of a user's taxes. In some embodiments, textual output may include a sentence or plurality of sentences describing the taxes of the user; as non-limiting examples, this may include, restrictions, timing, advice, dangers, benefits, and the like.

With continued reference to FIG. 1, in one or more embodiments, processor 104 may implement one or more aspects of "generative artificial intelligence (AI)," a type of AI that uses machine learning algorithms to create, establish, or otherwise generate data such as, without limitation, user score or comprehensive report and/or the like in any data structure as described herein (e.g., text, image, video, audio, among others) that is similar to one or more provided training examples. In an embodiment, machine learning module described herein may generate one or more generative machine learning models that are trained on one or more set of event training data and/or report training data. One or more generative machine learning models may be configured to generate new examples that are similar to the training data of the one or more generative machine learning models but are not exact replicas; for instance, and without limitation, data quality or attributes of the generated examples may bear a resemblance to the training data provided to one or more generative machine learning models, wherein the resemblance may pertain to underlying patterns, features, or structures found within the provided training data.

Still referring to FIG. 1, in some cases, generative machine learning models may include one or more generative models. As described herein, "generative models" refers to statistical models of the joint probability distribution P (X, Y) on a given observable variable x, representing features or data that can be directly measured or observed (e.g User Score and/or the first textual data set and the second textual data set) and target variable y, representing the outcomes or labels that one or more generative models aims to predict or generate (e.g., a comprehensive report and/or a user score). In some cases, generative models may rely on Bayes theorem to find joint probability; for instance, and without limitation, Naïve Bayes classifiers may be employed by processor 104 to categorize input data such as, without limitation the first textual data set and the second textual data set into different one or more tax events such as, without limitation, a notice of missing information for filing a tax credit.

In a non-limiting example, and still referring to FIG. 1, one or more generative machine learning models may include one or more Naïve Bayes classifiers generated, by processor 104, using a Naïve bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction.

Still referring to FIG. 1, although Naïve Bayes classifier may be primarily known as a probabilistic classification algorithm; however, it may also be considered a generative model described herein due to its capability of modeling the joint probability distribution P (X, Y) over observable variables X and target variable Y. In an embodiment, Naïve Bayes classifier may be configured to make an assumption that the features X are conditionally independent given class label Y, allowing generative model to estimate the joint distribution as P(X, Y)=P(Y)ΠiP(Xi|Y), wherein P(Y) may be the prior probability of the class, and P(X$_i$|Y) is the conditional probability of each feature given the class. One or more generative machine learning models containing Naïve Bayes classifiers may be trained on labeled training data, estimating conditional probabilities P(X$_i$|Y) and prior probabilities P(Y) for each class; for instance, and without limitation, using techniques such as Maximum Likelihood Estimation (MLE). One or more generative machine learning models containing Naïve Bayes classifiers may select a class label y according to prior distribution P(Y), and for each feature X$_i$, sample at least a value according to conditional distribution P (X$_i$|y). Sampled feature values may then be combined to form one or more new data instance with selected class label y. In a non-limiting example, one or more generative machine learning models may include one or more Naïve Bayes classifiers to generate new examples of a comprehensive reports and/or a user scores based on inputs as described herein, wherein the models may be trained using training data containing a plurality of features, and/or the like as input correlated to a plurality of labeled classes.

Still referring to FIG. 1, in some cases, one or more generative machine learning models may include generative adversarial network (GAN). As used in this disclosure, a "generative adversarial network" is a type of artificial neural network with at least two sub models (e.g., neural networks), a generator, and a discriminator, that compete against each other in a process that ultimately results in the generator learning to generate new data samples, wherein the "generator" is a component of the GAN that learns to create hypothetical data by incorporating feedbacks from the "discriminator" configured to distinguish real data from the hypothetical data. In some cases, generator may learn to make discriminator classify its output as real. In an embodiment, discriminator may include a supervised machine learning model while generator may include an unsupervised machine learning model as described in further detail with reference to FIG. 2.

With continued reference to FIG. 1, in an embodiment, discriminator may include one or more discriminative models, i.e., models of conditional probability P(Y|X=x) of target variable Y, given observed variable X. In an embodiment, discriminative models may learn boundaries between classes or labels in given training data. In a non-limiting example, discriminator may include one or more classifiers as described in further detail below with reference to FIG. 2 to distinguish between different categories, or states e.g., TRUE vs. FALSE within the context of generated data such as, without limitations, a comprehensive report and/or a user score, and/or the like. In some cases, processor 104 may implement one or more classification algorithms such as, without limitation, Support Vector Machines (SVM), Logistic Regression, Decision Trees, and/or the like to define decision boundaries.

Still referring to FIG. 1, processor 104 may support operations based on encrypted or otherwise confidential information. When required by remote device 140, transmissions and/or storage of information may contain additional security measures. Processor 104 may require user identity authentication through photo identification validation, biometric login, contractual confirmation, or other mechanism ensuring user is authorized to make the representations being made to remote device 140. Processor 104 may use additional security layers to enable secure financial transactions to or from remote device 140. Specific security implementations may be obligated based on payment type and third party requirements. In an embodiments, a first textual data set or a second textual data set may be encrypted. For example, a first/second textual data sets may be stored within an immutable sequential listing. In another example, the first/second textual data sets may be placed through an encryption process.

With continued reference to FIG. 1, apparatus 100 may perform or implement one or more aspects of a cryptographic system to encrypt. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

With continued reference to FIG. 1, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

With continued reference to FIG. 1, in some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

With continued reference to FIG. 1, in an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

With continued reference to FIG. 1, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

With continued reference to FIG. 1, alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

With continued reference to FIG. 1, a zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (TOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

With continued reference to FIG. 1, in an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

With continued reference to FIG. 1, A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still viewing FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Still referring to FIG. 1, processor 104 displays generated comprehensive report to the user after being compiled by report generation 152. This display may be made available to user through user device 116, GUI 132, and/or any other digital device capable of displaying image and text data. Additionally, displaying generated comprehensive report to the user may comprise printing the report in physical viewing form.

Figure 2:
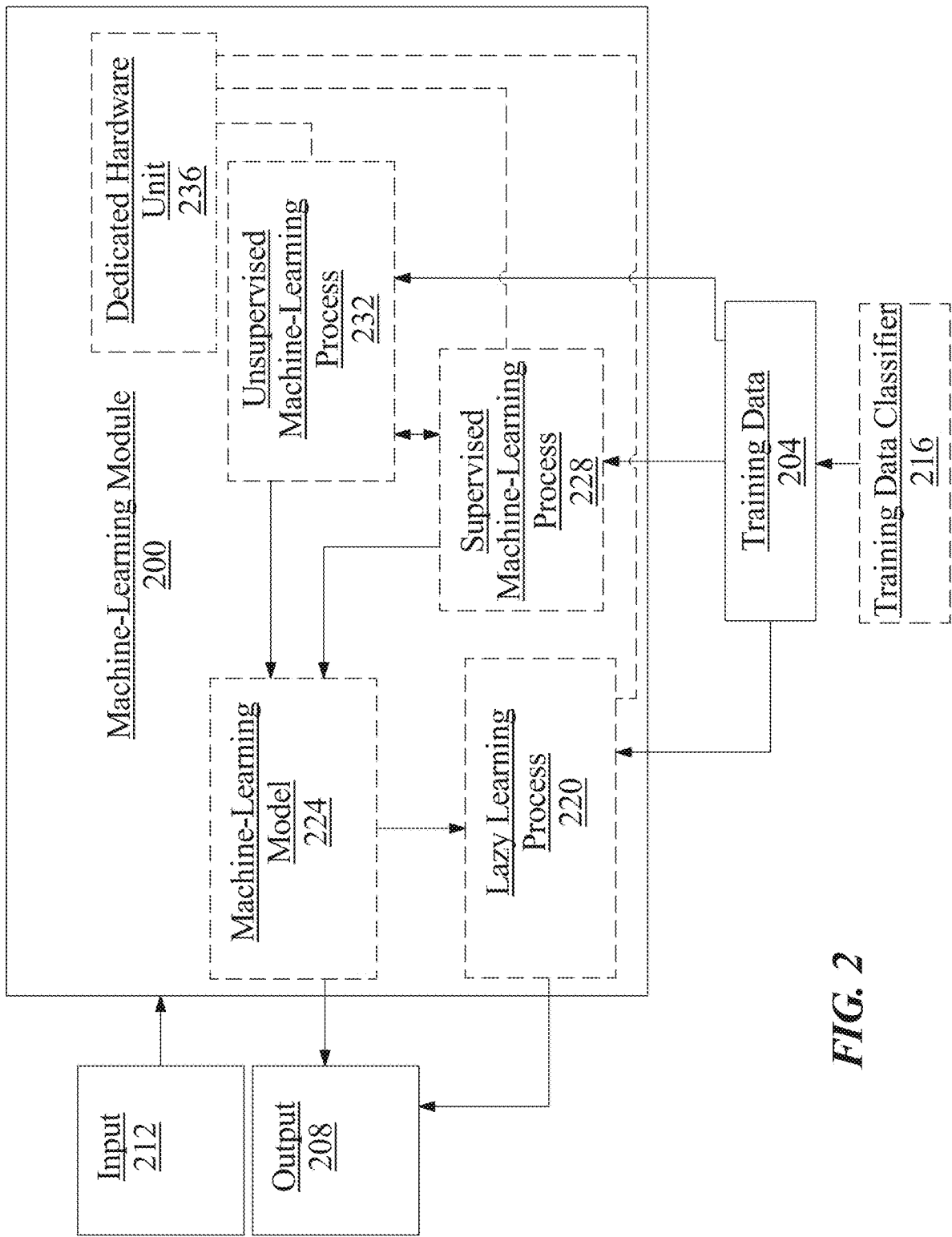
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module 200 may perform determinations, classification, and/or analysis steps, methods, processes, or the like as described in this disclosure using machine-learning processes. A "machine-learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine-learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," which may be in the form of user feedback validating certain machine-learning process operations, or user manually manipulating views and selections indicating that an option other than the primary provided option is better fit for the specific scenario. Similarly, user may decline a proposed form or option, which would be used as training data to at least marginally demote the option and at most completely suppress the option in future engagements. No matter the result, every user selection made from a tailored set of options or display is used as training data to inform subsequent user engagements. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may also include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data. These types of data entries may be used to provide the real-world examples representative of the target domain time series data protocols and formats.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a process whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors (KNN) classifiers, support vector machines, least squares support vector machines, fisher's linear discriminant, quadratic classifiers, decision trees, boosted trees, random forest classifiers, learning vector quantization, and/or neural network-based classifiers.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as time series data, images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more detected blurs. Detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures blurriness based on the gradient or first derivative of an image, based on the hypothesis that rapid changes indicate sharp edges in the image, and thus are indicative of a lower degree of blurriness. Blur detection may be performed using a Wavelet-based operator, which takes advantage of the capability of coefficients of the discrete wavelet transform to describe the frequency and spatial content of images. Blur detection may be performed using statistics-based operators to take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by up-sampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs down-sampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been down-sampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform down-sampling on data. Down-sampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine-learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a KNN, a lazy naïve Bayes algorithm, or the like. Persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. With regard to the current disclosure, both generator model and discriminator model are machine-learning models as described above.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine-learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task LASSO model wherein the norm applied in the least-squares term of the LASSO model is the Frobenius norm amounting to the square root of the sum of squares of all terms. Linear regression models may include the elastic net model, a multi-task elastic net model, a least angle regression model, a LARS LASSO model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Continuing to refer to FIG. 2, machine-learning model 224 may be configured using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) \, P(A) \div P(B)$, where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor may then calculate a likelihood table by calculating probabilities of different data entries and classification labels. Processor may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 2, machine-learning model 224 may be configured using a KNN algorithm. A "K-nearest neighbors algorithm" as used in this disclosure, includes a classification method that utilizes feature similarity to analyze how closely out-of-sample features resemble training data to classify input data to one or more clusters and/or categories of features as represented in training data; this may be performed by representing both training data and input data in vector forms, and using one or more measures of vector similarity to identify classifications within training data, and to determine a classification of input data. KNN algorithm may include specifying a K-value determining the most common classifier of the entries in the database and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 2, generating KNN algorithm may generate a first vector output containing a data entry cluster, generating a second vector output containing input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number experience of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/ or modules such as without limitation application specific integrated circutis (ASICs), production and/or configuration of reconfigurable hardware elements, circuits, and/or modules such as, without limitation, Field Programmable Gate Arrays (FPGAs), production and/or of non-reconfigurable and/or configuration non-rewritable memory elements, circuits, and/or modules such as without limitation non-rewritable read only memory (ROM), production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above. Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like. A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
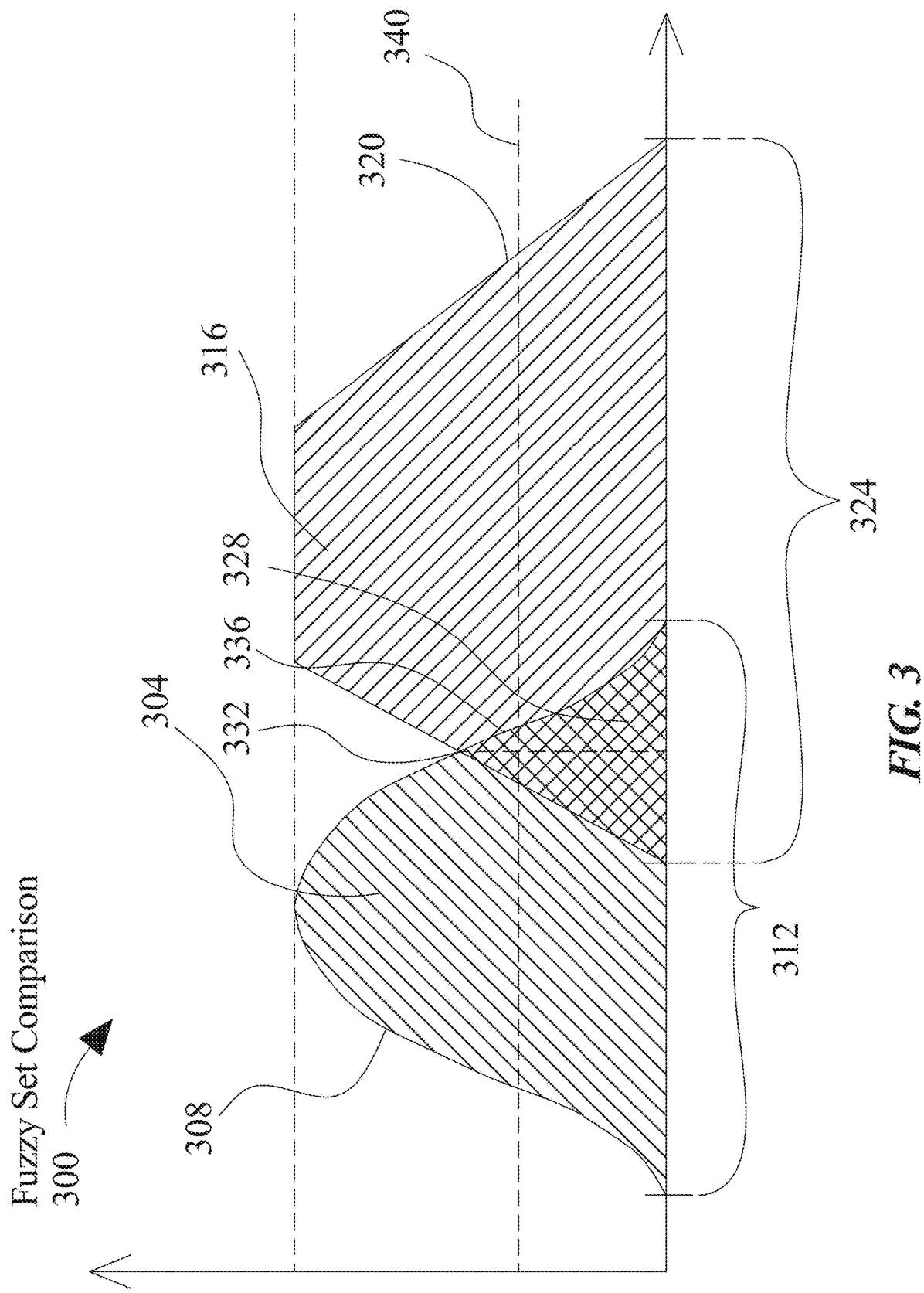
FIG. 3 is an exemplary embodiment of a fuzzy set comparison.

Referring to FIG. 3, an exemplary embodiment of fuzzy set comparison 300 is illustrated. A first fuzzy set 304 may be represented, without limitation, according to a first membership function 308 representing a probability that an input falling on a first range of values 312 is a member of the first fuzzy set 304, where the first membership function 308 has values on a range of probabilities such as without limitation the interval [0,1], and an area beneath the first membership function 308 may represent a set of values within first fuzzy set 304. Although first range of values 312 is illustrated for clarity in this exemplary depiction as a range on a single number line or axis, first range of values 312 may be defined on two or more dimensions, representing, for instance, a Cartesian product between a plurality of ranges, curves, axes, spaces, dimensions, or the like. First membership function 308 may include any suitable function mapping first range 312 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \le x < b \\ \frac{c-x}{c-b}, & \text{if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 3, first fuzzy set 304 may represent any value or combination of values as described above, including a descriptor or set of descriptors assigned by a profile classifier, or specific form or process the apparatus is capable of engaging which carries a separate set of static descriptors or qualities. A second fuzzy set 316, which may represent any value which may be represented by first fuzzy set 304, may be defined by a second membership function 320 on a second range 324; second range 324 may be identical and/or overlap with first range 312 and/or may be combined with first range via Cartesian product or the like to generate a mapping permitting evaluation overlap of first fuzzy set 304 and second fuzzy set 316. Where first fuzzy set 304 and second fuzzy set 316 have a region 328 that overlaps, first membership function 308 and second membership function 320 may intersect at a point 332 representing a probability, as defined on probability interval, of a match between first fuzzy set 304 and second fuzzy set 316. Alternatively or additionally, a single value of first and/or second fuzzy set may be located at a locus 336 on first range 312 and/or second range 324, where a probability of membership may be taken by evaluation of first membership function 308 and/or second membership function 320 at that range point. A probability at 328 and/or 332 may be compared to a threshold 340 to determine whether a positive match is indicated. Threshold 340 may, in a non-limiting example, represent a degree of match between first fuzzy set 304 and second fuzzy set 316, and/or single values therein with each other or with either set, which is sufficient for purposes of the matching process; for instance, threshold may indicate a sufficient degree of overlap between a profile descriptor and a specific government entity engagement, as described above. Alternatively or additionally, each threshold may be tuned by a machine-learning and/or statistical process, for instance and without limitation as described in further detail below.

Further referring to FIG. 3, in an embodiment, a degree of match between fuzzy sets may be used to classify a first textual data set to a specific IRS form. For instance, if a first textual data set has a fuzzy set matching a Schedule C, Form 1040 fuzzy set by having a degree of overlap exceeding a threshold, processor may recommend the filing of a Schedule C, Form 1040 based on the profile. Where multiple fuzzy matches are performed, degrees of match for each respective fuzzy set may be computed and aggregated through, for instance, addition, averaging, or the like, to determine an overall degree of match.

Still referring to FIG. 3, in an embodiment, a first textual data set may be compared to multiple descriptor fuzzy sets. For instance, first textual data set may be represented by a fuzzy set that is compared to each of the multiple descriptors fuzzy sets; and a degree of overlap exceeding a threshold between the first textual data set fuzzy set and any of the descriptor fuzzy sets may cause processor to assign a plurality of descriptors to each first textual data set. For instance, in one embodiment there may be two descriptor fuzzy sets, representing respectively an individual taxpayer and a large corporation. Individual taxpayer may have an individual tax payer fuzzy set; large corporation may have a large corporation fuzzy set. Then each type of tax filing or form submission may have its own unique fuzzy set. Processor, for example, may compare an individual taxpayer fuzzy set with each tax filing form fuzzy sets, as described above, and classify taxpayer to one, multiple, or none of the tax form fuzzy sets. Machine-learning methods as described throughout may, in a non-limiting example, generate coefficients used in fuzzy set equations as described above, such as without limitation x, c, and ci of a Gaussian set as described above, as outputs of machine-learning methods.

Figure 4:
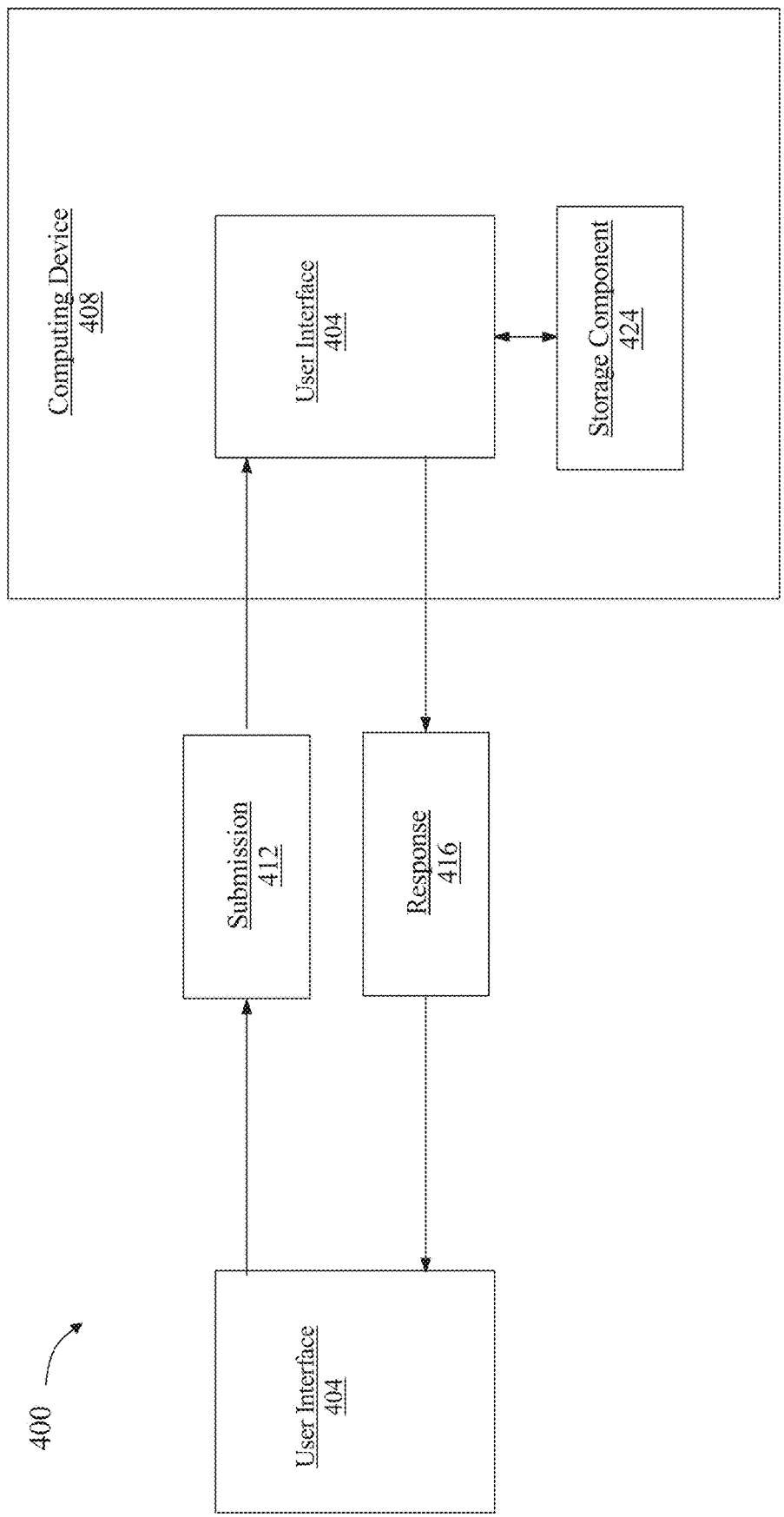
FIG. 4 is a block diagram of an exemplary chatbot exchange process.

Referring to FIG. 4, a chatbot system 400 is schematically illustrated. According to some embodiments, a user interface 404 may be communicative with a computing device 408 that is configured to operate a chatbot. In some cases, user interface 404 may be local to computing device 408. Alternatively or additionally, in some cases, user interface 404 may remote to computing device 408 and communicative with the computing device 408, by way of one or more networks, such as without limitation the internet. Alternatively or additionally, user interface 404 may communicate with user device 408 using telephonic devices and networks, such as without limitation fax machines, short message service (SMS), or multimedia message service (MMS). Commonly, user interface 404 communicates with computing device 408 using text-based communication, for example without limitation using a character encoding protocol, such as American Standard for Information Interchange (ASCII). Typically, a user interface 404 conversationally interfaces a chatbot, by way of at least a submission 412, from the user interface 408 to the chatbot, and a response 416, from the chatbot to the user interface 404. In many cases, one or both of submission 412 and response 416 are text-based communication. Alternatively or additionally, in some cases, one or both of submission 412 and response 416 are audio-based communication.

Continuing in reference to FIG. 4, a submission 412 once received by computing device 408 operating a chatbot, may be processed by a processor. In some embodiments, processor processes a submission 412 using one or more of keyword recognition, pattern matching, and natural language processing. In some embodiments, processor employs real-time learning with evolutionary algorithms. In some cases, processor may retrieve a pre-prepared response from at least a storage component 420, based upon submission 412. Alternatively or additionally, in some embodiments, processor communicates a response 416 without first receiving a submission 412, thereby initiating conversation. In some cases, processor communicates an inquiry to user interface 404; and the processor is configured to process an answer to the inquiry in a following submission 412 from the user interface 404. In some cases, an answer to an inquiry present within a submission 412 from a user device 404 may be used by computing device 408 as an input to another function.

With continued reference to FIG. 4, chatbot may be configured to provide a user with a plurality of options as an input into the chatbot. Chatbot entries may include multiple choice, short answer response, true or false responses, and the like. A user may decide on what type of chatbot entries are appropriate. In some embodiments, the chatbot may be configured to allow the user to input a freeform response into the chatbot. Chatbot may then use a decision tree, data base, or other data structure to respond to the user's entry into the chatbot as a function of a chatbot input. As used in the current disclosure, "Chatbot input" is any response that an entity or user inputs into a chatbot as a response to a prompt or question.

With continuing reference to FIG. 4, computing device 408 may be configured to respond to a chatbot input using a decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least a candidate input into a chatbot. Decision tree has at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes to inputs of terminal nodes. Computing device 408 may generate two or more decision trees, which may overlap; for instance, a root node of one tree may connect to and/or receive output from one or more terminal nodes of another tree, intermediate nodes of one tree may be shared with another tree, or the like.

Still referring to FIG. 4, computing device 408 may build decision tree by following relational identification; for example, relational indication may specify that a first rule module receives an input from at least a second rule module and generates an output to at least a third rule module, and so forth, which may indicate to computing device 408 an in which such rule modules will be placed in decision tree. Building decision tree may include recursively performing mapping of execution results output by one tree and/or subtree to root nodes of another tree and/or subtree, for instance by using such execution results as execution parameters of a subtree. In this manner, computing device 408 may generate connections and/or combinations of one or more trees to one another to define overlaps and/or combinations into larger trees and/or combinations thereof. Such connections and/or combinations may be displayed by visual interface to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. Alternatively or additionally, subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

Continuing to refer to FIG. 4, decision tree may incorporate one or more manually entered or otherwise provided decision criteria. Decision tree may incorporate one or more decision criteria using an API. Decision tree may establish a link to a remote decision module, device, system, or the like. Decision tree may perform one or more database lookups and/or look-up table lookups. Decision tree may include at least a decision calculation module, which may be imported via an API, by incorporation of a program module in source code, executable, or other form, and/or linked to a given node by establishing a communication interface with one or more exterior processes, programs, systems, remote devices, or the like; for instance, where a user operating system has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision. In a non-limiting embodiment, based on a limited set of subject data provided for input, decision tree may generate a plurality of follow-up questions, each based on the aggregated sum of data available from all inputs. In a non-limiting embodiment, user may input a previously filed IRS form 1040, which would narrow chatbot interaction to only IRS centered topics. Chatbot would then generate a series of queries to narrow down the specific IRS engagement to satisfy user's needs. These queries may consist of questions to identify if user has filed for the current year, what changes have occurred in user's family or employment status that may affect user's filing status, and if any new deductible activities occurred, especially if the prior tax submission did include certain deductions. Chatbot's goal is to initially identify the appropriate government entity, then narrow the engagement type down from the available types of engagements with that government entity, then identify the specific forms and information to complete those forms so they may be automatically submitted. User feedback to affirm or reject any proposed form or operation would be used as training data for future chatbot interrogations as described above.

Figure 5:
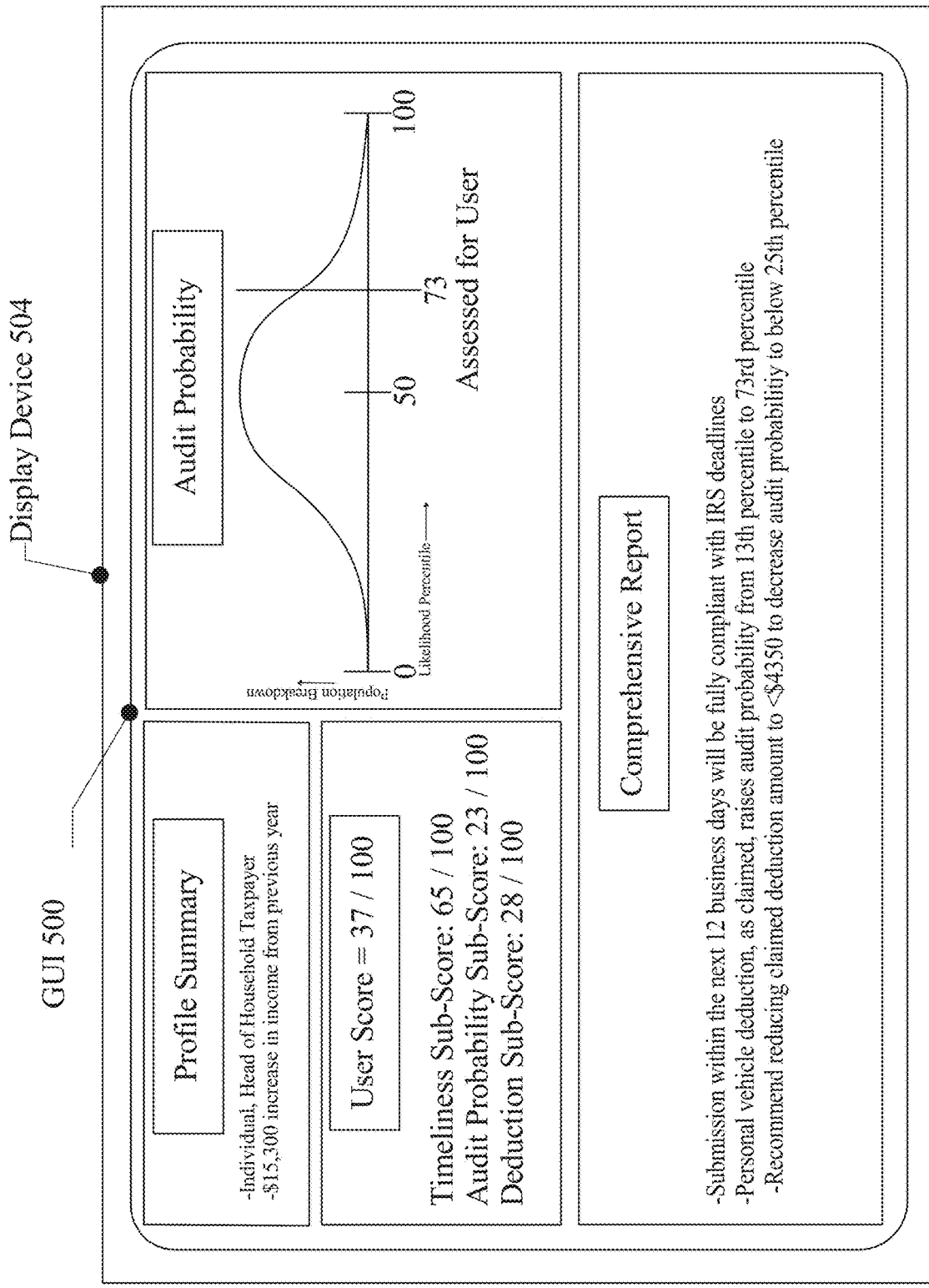
FIG. 5 is a diagram of an exemplary embodiment of a graphical user interface.

Referring now to FIG. 5, an exemplary embodiment of a GUI is illustrated. GUI 500 may be displayed within any display device 504 as described above. GUI 500 is a dynamically shifting, user-specific interface designed to simplify user's engagement with external entities based on historical usage and patterns, as well as user's personal profile and available data. GUI 500 may contain a modifiable personalized dashboard, such that user may select the types of options, displays, and responses GUI 500 presents to user. In a non-limiting embodiment, user may specify the metrics and displays to be shown within user's personalized dashboard.

Figure 6:
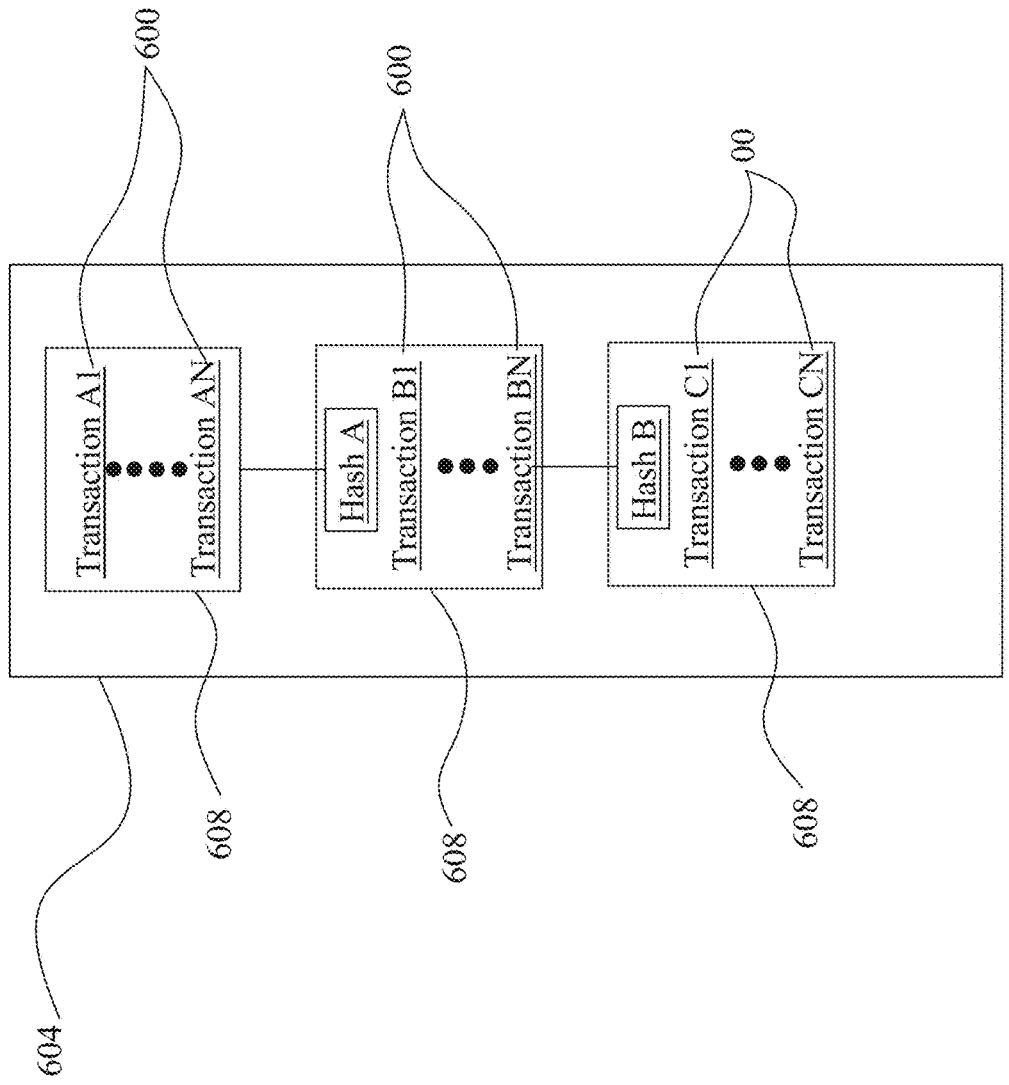
FIG. 6 is a block diagram of exemplary embodiment of an immutable sequential listing.

Referring now to FIG. 6, an exemplary embodiment of an immutable sequential listing is illustrated. An "immutable sequential listing," as used in this disclosure, is a data structure that places data entries in a fixed sequential arrangement, such as a temporal sequence of entries and/or blocks thereof, where the sequential arrangement, once established, cannot be altered, or reordered. An immutable sequential listing may be, include and/or implement an immutable ledger, where data entries that have been posted to the immutable sequential listing cannot be altered. Data elements are listing in immutable sequential listing; data elements may include any form of data, including textual data, image data, encrypted data, cryptographically hashed data, and the like. Data elements may include, without limitation, one or more at least a digitally signed assertions. In one embodiment, a digitally signed assertion 604 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 604. In an embodiment, collection of textual data states that the owner of a certain transferable item represented in a digitally signed assertion 604 register is transferring that item to the owner of an address. A digitally signed assertion 604 may be signed by a digital signature created using the private key associated with the owner's public key, as described above.

Still referring to FIG. 6, a digitally signed assertion 604 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 604 may describe the transfer of a physical good; for instance, a digitally signed assertion 604 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 604 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 6, in one embodiment, an address is a textual datum identifying the recipient of virtual currency or another item of value in a digitally signed assertion 604.

In some embodiments, address is linked to a public key, the corresponding private key of which is owned by the recipient of a digitally signed assertion 604. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 604 may record a subsequent a digitally signed assertion 604 transferring some or all of the value transferred in the first a digitally signed assertion 604 to a new address in the same manner. A digitally signed assertion 604 may contain textual information that is not a transfer of some item of value in addition to, or as an alternative to, such a transfer. For instance, as described in further detail below, a digitally signed assertion 604 may indicate a confidence level associated with a distributed storage node as described in further detail below.

In an embodiment, and still referring to FIG. 6 immutable sequential listing records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 6, immutable sequential listing may preserve the order in which the at least a posted content took place by listing them in chronological order; alternatively or additionally, immutable sequential listing may organize digitally signed assertions 604 into sub-listings 608 such as "blocks" in a blockchain, which may be themselves collected in a temporally sequential order; digitally signed assertions 604 within a sub-listing 608 may or may not be temporally sequential. The ledger may preserve the order in which at least a posted content took place by listing them in sub-listings 608 and placing the sub-listings 608 in chronological order. The immutable sequential listing may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 6, immutable sequential listing, once formed, may be inalterable by any party, no matter what access rights that party possesses. For instance, immutable sequential listing may include a hash chain, in which data is added during a successive hashing process to ensure non-repudiation. Immutable sequential listing may include a block chain. In one embodiment, a block chain is immutable sequential listing that records one or more new at least a posted content in a data item known as a sub-listing 608 or "block." An example of a block chain is the BITCOIN block chain used to record BITCOIN transactions and values. Sub-listings 608 may be created in a way that places the sub-listings 608 in chronological order and link each sub-listing 608 to a previous sub-listing 608 in the chronological order so that any computing device may traverse the sub-listings 608 in reverse chronological order to verify any at least a posted content listed in the block chain. Each new sub-listing 608 may be required to contain a cryptographic hash describing the previous sub-listing 608. In some embodiments, the block chain contains a single first sub-listing 608 sometimes known as a "genesis block."

Still referring to FIG. 6, the creation of a new sub-listing 608 may be computationally expensive; for instance, the creation of a new sub-listing 608 may be designed by a "proof of work" protocol accepted by all participants in forming the immutable sequential listing to take a powerful set of computing devices a certain period of time to produce. Where one sub-listing 608 takes less time for a given set of computing devices to produce the sub-listing 608 protocol may adjust the algorithm to produce the next sub-listing 608 so that it will require more steps; where one sub-listing 608 takes more time for a given set of computing devices to produce the sub-listing 608 protocol may adjust the algorithm to produce the next sub-listing 608 so that it will require fewer steps. As an example, protocol may require a new sub-listing 608 to contain a cryptographic hash describing its contents; the cryptographic hash may be required to satisfy a mathematical condition, achieved by having the sub-listing 608 contain a number, called a nonce, whose value is determined after the fact by the discovery of the hash that satisfies the mathematical condition. Continuing the example, the protocol may be able to adjust the mathematical condition so that the discovery of the hash describing a sub-listing 608 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 608 according to the protocol is known as "mining." The creation of a new sub-listing 608 may be designed by a "proof of stake" protocol as will be apparent to those skilled in the art upon reviewing the entirety of this disclosure.

Continuing to refer to FIG. 6, in some embodiments, protocol also creates an incentive to mine new sub-listings 608. The incentive may be financial; for instance, successfully mining a new sub-listing 608 may result in the person or entity that mines the sub-listing 608 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 608 Each sub-listing 608 created in immutable sequential listing may contain a record or at least a posted content describing one or more addresses that receive an incentive, such as virtual currency, as the result of successfully mining the sub-listing 608.

With continued reference to FIG. 6, where two entities simultaneously create new sub-listings 608, immutable sequential listing may develop a fork; protocol may determine which of the two alternate branches in the fork is the valid new portion of the immutable sequential listing by evaluating, after a certain amount of time has passed, which branch is longer. "Length" may be measured according to the number of sub-listings 608 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 608 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing.

Still referring to FIG. 6, additional data linked to at least a posted content may be incorporated in sub-listings 608 in the immutable sequential listing; for instance, data may be incorporated in one or more fields recognized by block chain protocols that permit a person or computer forming a at least a posted content to insert additional data in the immutable sequential listing. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 6, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 608 in a block chain computationally challenging; the incentive for producing sub-listings 608 may include the grant of new crypto-currency to the miners. Quantities of crypto-currency may be exchanged using at least a posted content as described above.

Figure 7:
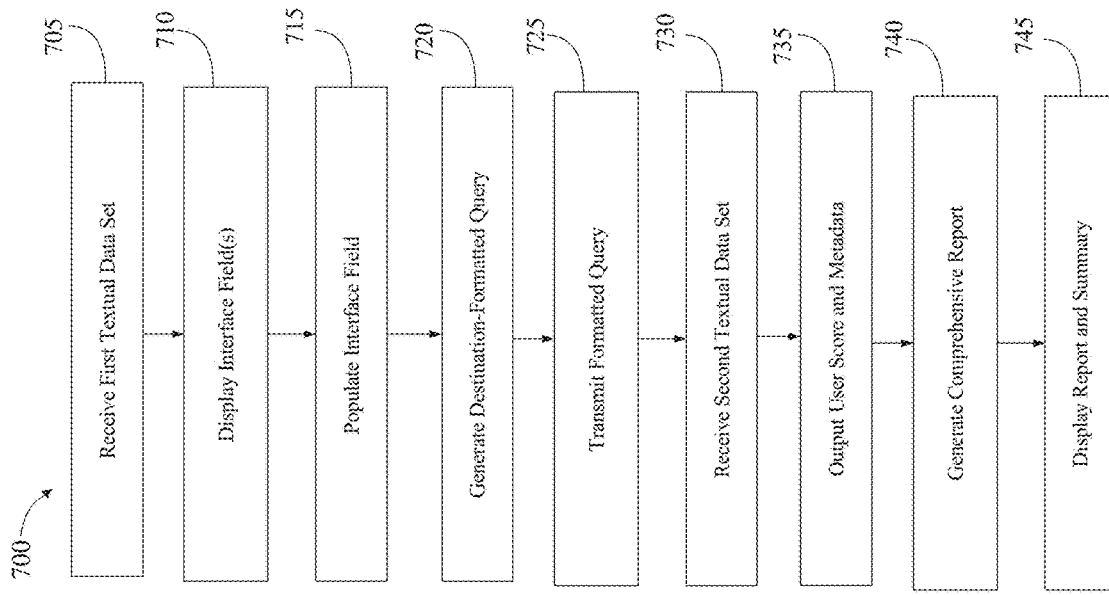
FIG. 7 is a flow diagram of an exemplary method for dynamic data and language synthesis and automated interfacing.

Referring now to FIG. 7, a flow diagram of an exemplary method 700 for dynamic data synthesis and automated interfacing is illustrated. At step 705, method 700 includes receiving, using the at least a processor, a first textual data set. This may be implemented as described and with reference to FIGS. 1-7.

Still referring to FIG. 7, at step 710, method 700 includes displaying, using the at least the processor, the interface field(s). This may be implemented as described and with reference to FIGS. 1-7.

Still referring to FIG. 7, at step 715, method 700 includes populating, using the at least a processor, the displayed interface field(s). This may be implemented as described and with reference to FIGS. 1-7.

Still referring to FIG. 7, at step 720, method 700 includes generating, using the at least a processor, a destination-formatted query. This may be implemented as described and with reference to FIGS. 1-7.

Still referring to FIG. 7, at step 725, method 700 includes transmitting, using the at least a processor, the formatted query to a remote device. This may be implemented as described and with reference to FIGS. 1-7.

Still referring to FIG. 7, at step 730, method 700 includes receiving, using the at least a processor, a second textual data set from the remote device. This may be implemented as described and with reference to FIGS. 1-7.

Still referring to FIG. 7, at step 735, method 700 includes outputting, using the at least a processor, a user score and affiliated metadata. This may be implemented as described and with reference to FIGS. 1-7.

Still referring to FIG. 7, at step 740, method 700 includes generating, using the at least a processor, a comprehensive report. This may be implemented as described and with reference to FIGS. 1-7.

Still referring to FIG. 7, at step 745, method 700 includes displaying, using the at least a processor, the comprehensive report and engagement summary to the user. This may be implemented as described and with reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
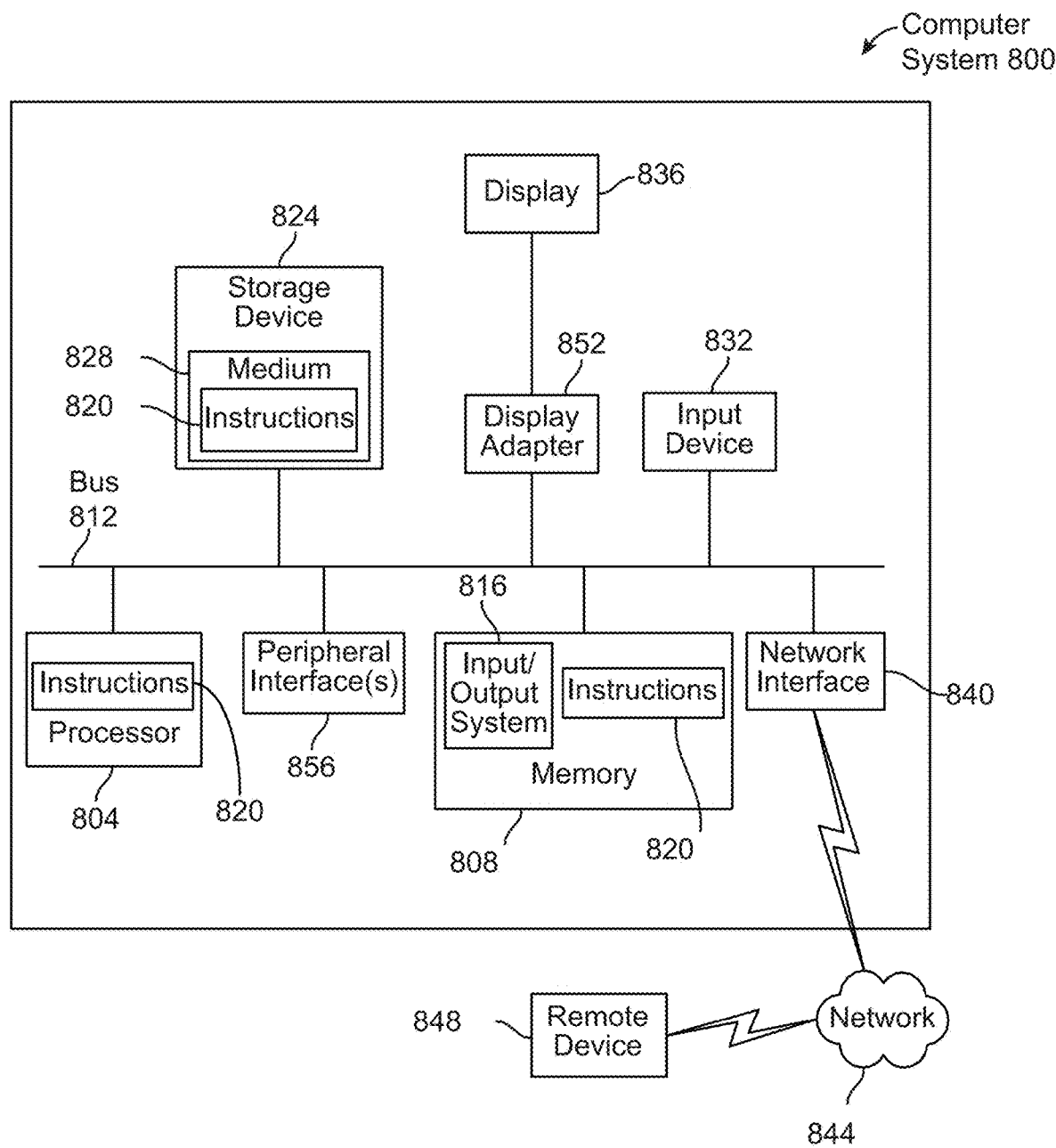
FIG. 8 is a block diagram of a computing system that can be used to implement any one or more of the methodologies disclosed herein and any one or more portions thereof.

Referring now to FIG. 8, a diagrammatic representation of one embodiment of a computing device in the exemplary form of a computer system 800 within which a set of instructions for causing a control system to perform any one or more of the aspects and/or methodologies of the present disclosure may be executed is illustrated. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), FPGA, Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for dynamic data synthesis, wherein the apparatus comprises:
   at least a processor, and a memory communicatively connected to the at least a processor, the memory containing instructions configuring the at least a processor to:
   receive a first textual data set;
   display, at a user device, at least an interface field;
   populate the at least an interface field with at least an element of the first textual data set;
   generate a destination-formatted query using the populated at least an interface field;

iteratively transmit the destination-formatted query to a remote device;
receive, from the remote device and based on the query, a second textual data set;
output a user score and a set of score metadata based on the first textual data set and the second textual data set, wherein determining the user score further comprises:
  determining a plurality of sub-scores;
  outputting the user score as a function of the plurality of sub-scores; and
  outputting the set of score metadata as a function of the user score and each sub-score of the plurality of sub-scores;
generate a comprehensive report using a language model and based on the user score and the set of score metadata; and
display generated comprehensive report to the user.

2. The apparatus of claim 1, wherein receiving the first textual data set from the user comprises:
  receiving at least a non-textual document; and
  extracting at least a textual datum from the at least a non-textual document using optical character recognition.

3. The apparatus of claim 1, wherein displaying, at the user device, at least an interface field comprises displaying at least a plurality of real-time, automated interface field modifications based on the first textual data set and user selections.

4. The apparatus of claim 1, wherein populating the at least an interface field with at least an element of the first textual data set comprises:
  identifying at least a missing element of the first textual data set; and
  supplementing the first textual data set with at least an additional data element.

5. The apparatus of claim 4, wherein supplementing further comprises retrieving the at least an additional data element from historic database entries.

6. The apparatus of claim 4, wherein supplementing further comprises generating the at least an additional element using a machine-learning process.

7. The apparatus of claim 1, wherein populating the at least an interface field with at least an element of the first textual data set comprises:
  identifying a plurality of requisite or supportive data not yet disclosed using machine-learning processes and based on the first textual data set; and
  presenting a subsequent plurality of interface fields to the user by updating available fields, highlighting fields with available user inputs, and/or presenting a generated dialogue window with the subsequent interface fields enclosed.

8. The apparatus of claim 1, wherein generating a destination-formatted query using the populated at least an interface field comprises;
  searching a historical database for the accepted format;
  validating or retrieving the accepted format from the remote device; and
  applying the validated accepted format from the remote device to the populated at least an interface field with at least an element of the first textual data set.

9. The apparatus of claim 1, wherein outputting a user score and set of score metadata based on the first textual data set and second textual data set comprises conducting an objective assessment representative of the type of assessment the destination recipient would conduct.

10. The apparatus of claim 1, wherein generating a comprehensive report using a language model is based on the assessed user score and the set of score metadata comprises promoting and displaying to the user the substantive portions which diverge from historical norms, significantly contribute to user score, or portions which constrain or obligate future actions.

11. A method for dynamic data synthesis, wherein the method comprises:
  receiving, by the at least a processor, a first textual data set;
  displaying at a user device, by the at least a processor, at least an interface field;
  populating, by the at least a processor, the at least an interface field with at least an element of the first textual data set;
  generating, by the at least a processor, a destination-formatted query using the populated at least an interface field;
  iteratively transmitting, by the at least a processor, the formatted query to a remote device;
  receiving, by the at least a processor, from the remote device and based on the query, a second textual data set;
  outputting, by the at least a processor, a user score and a set of score metadata based on the first textual data set and the second textual data set, wherein
  determining the user score further comprises:
    determining, by the at least a processor, a plurality of sub-scores;
    outputting, by the at least a processor, the user score as a function of the plurality of sub-scores; and
    outputting, by the at least a processor, the set of score metadata as a function of the user score and each sub-score of the plurality of sub-scores;
  generating, by the at least a processor, a comprehensive report using a language model and based on the user score and the set of score metadata; and
  displaying, by the at least a processor, generated comprehensive report to the user.

12. The method of claim 11, wherein receiving the first textual data set from the user comprises:
  receiving, by the at least a processor, at least a non-textual document; and
  extracting, by the at least a processor, at least a textual datum from the at least a non-textual document using optical character recognition.

13. The method of claim 11, wherein displaying at the user device, at least an interface field comprises displaying, by the at least a processor, at least a plurality of real-time, automated interface field modifications based on the first textual data set and user selections.

14. The method of claim 11, wherein generatively augmenting the first textual data set comprises:
  identifying, by the at least a processor, at least a missing element of the first textual data set; and
  supplementing, by the at least a processor, the first textual data set with at least an additional data element.

15. The method of claim 14, wherein supplementing further comprises retrieving, by the at least a processor, the at least an additional data element from historic database entries.

16. The method of claim 14, wherein supplementing further comprises generating, by the at least a processor, the at least an additional element using a machine-learning process.

17. The method of claim 11, wherein populating the at least an interface field with at least an element of the first textual data set comprises;
- identifying, by the at least a processor, a plurality of requisite or supportive data not yet disclosed using machine-learning processes and based on the first textual data set; and
- presenting, by the at least a processor, a subsequent plurality of interface fields to the user by updating available fields, highlighting fields with available user inputs, and/or presenting a generated dialogue window with the subsequent interface fields enclosed.

18. The method of claim 11, wherein generating a destination-formatted query using the populated at least an interface field comprises;
- searching, by the at least a processor, a historical database for the accepted format;
- validating or retrieving, by the at least a processor, the accepted format from the remote device; and
- applying, by the at least a processor, the validated accepted format from the remote device to the populated at least an interface field with at least an element of the first textual data set.

19. The method of claim 11, wherein assessing a user score based on the first textual data set, second textual data set, and elected engagement historical standards comprises conducting, by the at least a processor, an objective assessment representative of the type of assessment the destination recipient would conduct.

20. The method of claim 11, wherein generating a comprehensive report using a language model is based on the assessed user score, first textual data set, second textual data set, associated metadata, and historical standards and comprises promoting and displaying to the user, by the at least a processor, the substantive portions which diverge from historical norms, significantly contribute to user score, or portions which constrain or obligate future actions.

* * * * *